March 17, 1936.   H. C. KELLOGG   2,034,300
MECHANICALLY COOLED DISPENSING APPARATUS
Original Filed Aug. 28, 1931   5 Sheets—Sheet 1
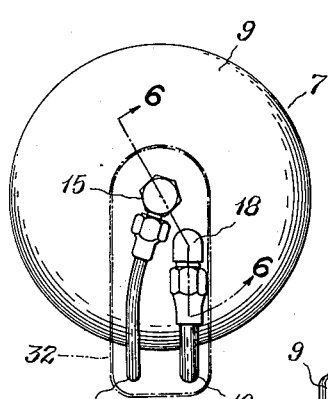
FIG. 3
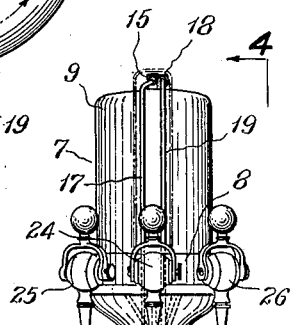
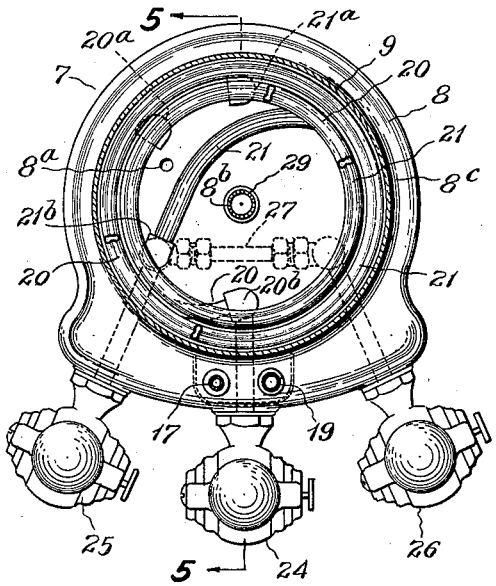
FIG. 2
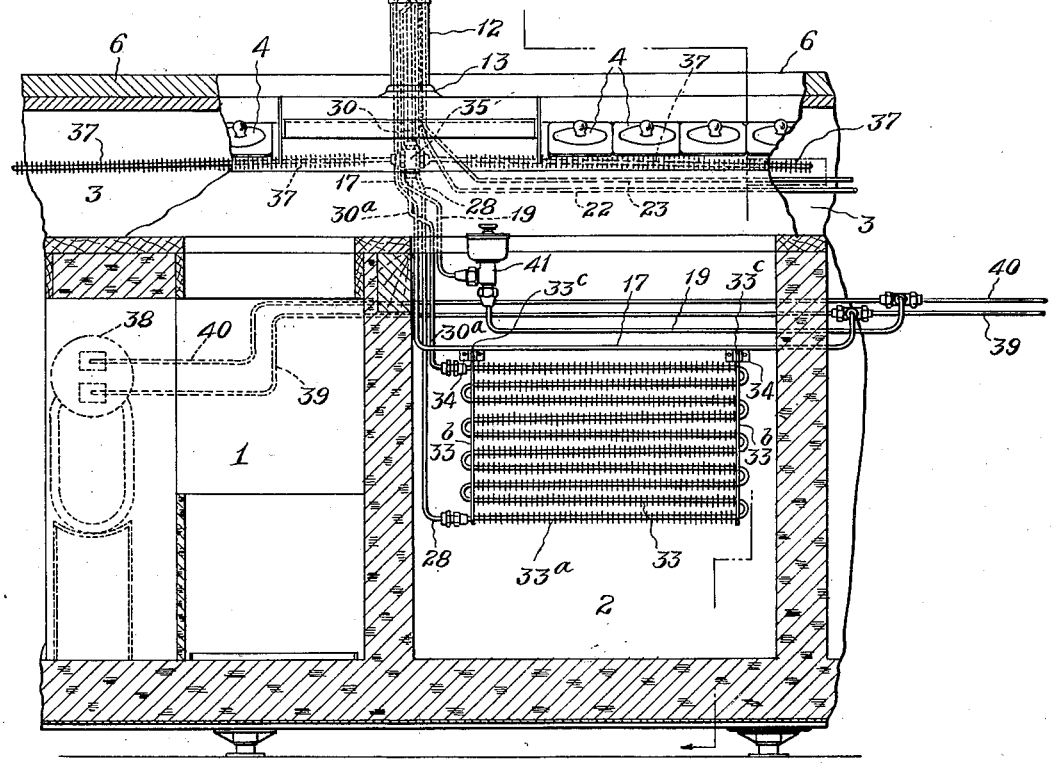
FIG. 1
INVENTOR:
Herbert C. Kellogg
BY Ray S. Kehr
ATTORNEY March 17, 1936.  H. C. KELLOGG  2,034,300

MECHANICALLY COOLED DISPENSING APPARATUS

Original Filed Aug. 28, 1931  5 Sheets-Sheet 2

INVENTOR:
Herbert C. Kellogg
BY Ray S. Kehr
ATTORNEY.

March 17, 1936.　　　H. C. KELLOGG　　　2,034,300
MECHANICALLY COOLED DISPENSING APPARATUS
Original Filed Aug. 28, 1931　　5 Sheets-Sheet 3
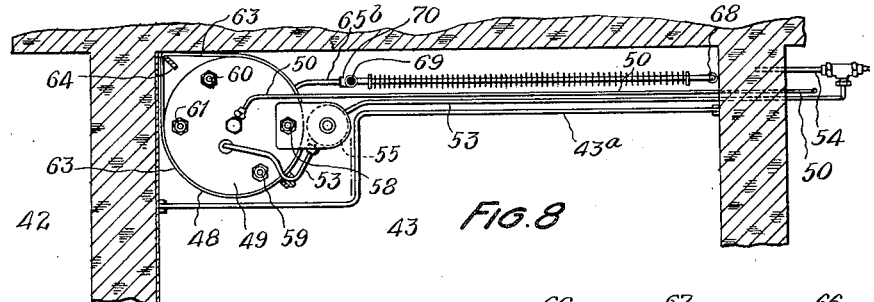
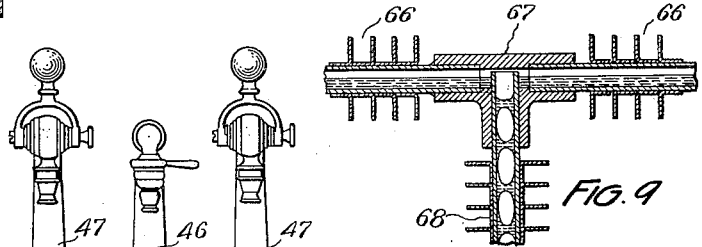
FIG. 9
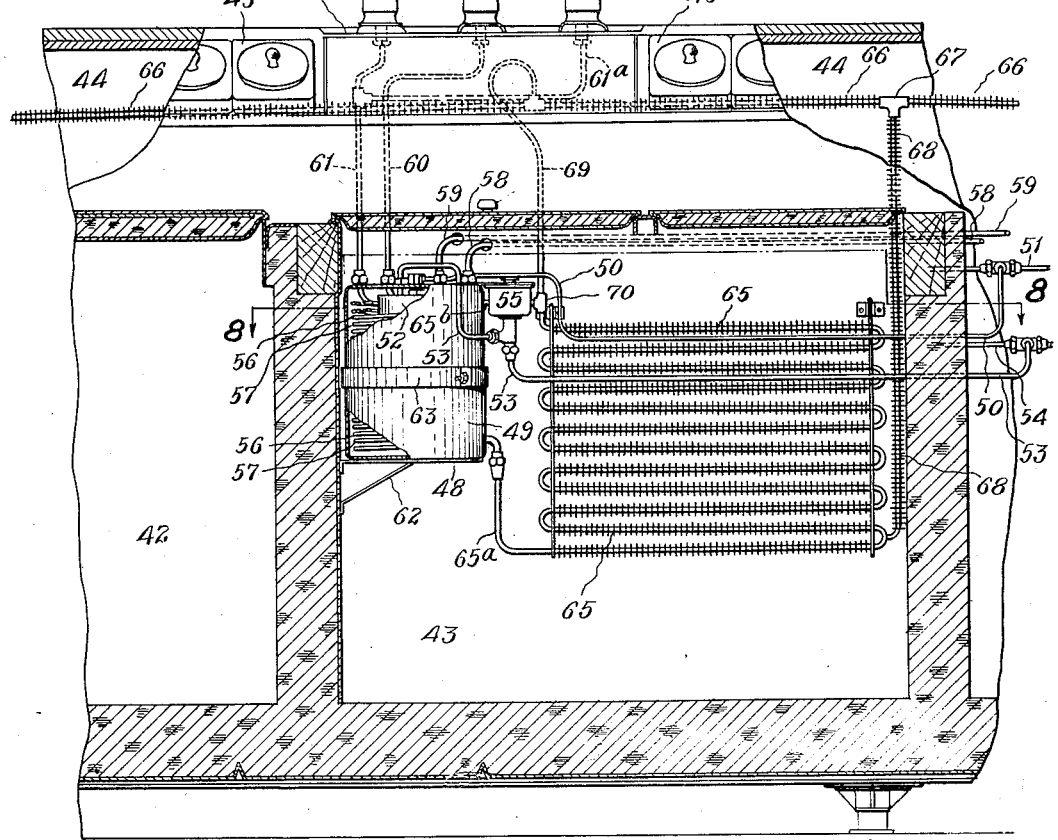
FIG. 7
INVENTOR:
Herbert C. Kellogg
BY Ray H. Fehr
ATTORNEY.

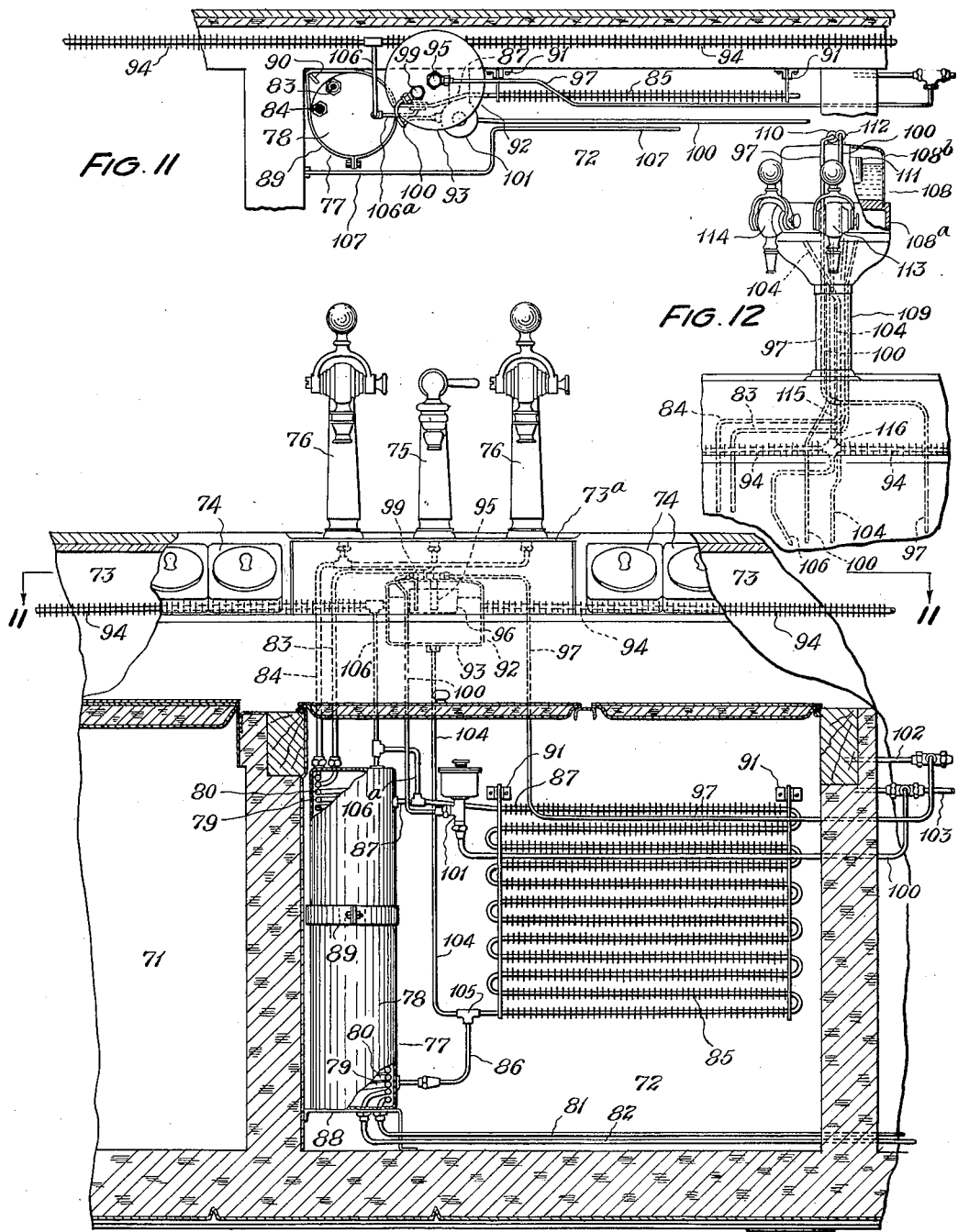

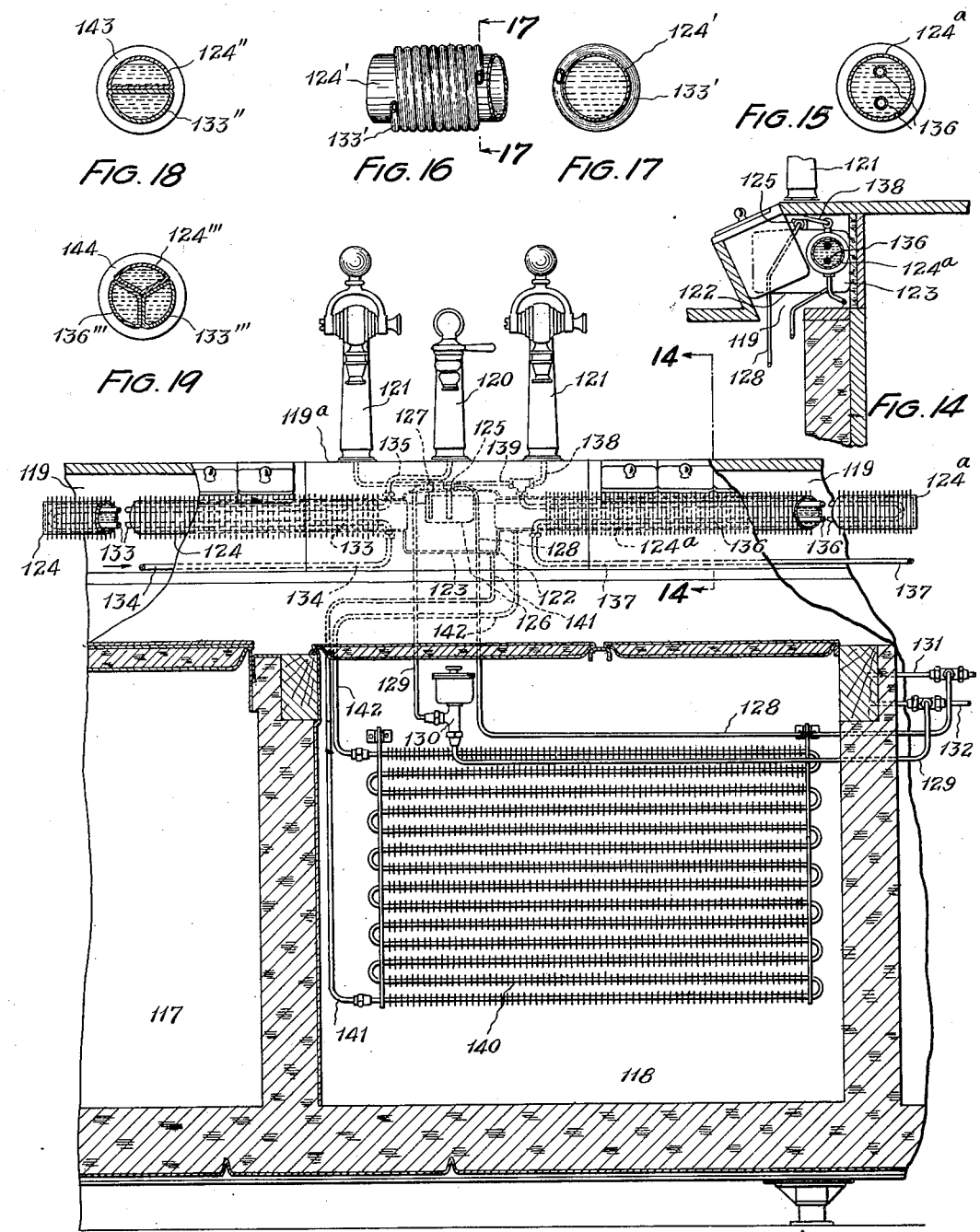

Patented Mar. 17, 1936

2,034,300

UNITED STATES PATENT OFFICE 2,034,300

MECHANICALLY COOLED DISPENSING APPARATUS

Herbert C. Kellogg, Detroit, Mich., assignor to Temprite Products Corporation, a corporation of Michigan Application August 28, 1931, Serial No. 559,865
Renewed July 2, 1934

29 Claims. (Cl. 62—141)

The invention relates to beverage dispensing apparatus such as soda fountains and particularly to improved mechanical refrigerating apparatus for cooling the liquid on draft and the various storage compartments of the apparatus.

The chief objects of the invention are comprised in the provision of means for cooling the liquid or liquids on draft and one or more storage compartments, which is characterized by a high degree of effectiveness in maintaining the draft liquids and the storage compartments at the desired temperatures, by great compactness so that a maximum of usable storage space is secured, by marked simplicity of construction, reliability in operation and moderate first cost, and by novel and attractive appearance of the cooling means for the liquid on draft.

Other objects more or less incidental or ancillary to the foregoing, as well as the preferred manner of carrying out the invention, will be apparent from the following description in connection with the accompanying drawings in which I illustrate several forms of apparatus embodying my improvements.

In the accompanying drawings, Fig. 1 is a view of the central part of a soda fountain, showing some parts of the fountain structure in vertical, longitudinal section and other parts thereof in elevation.

Fig. 2 is an enlarged horizontal sectional view of the liquid cooling apparatus shown in Fig. 1, the section being taken on the line 2—2 of Fig. 5.

Fig. 3 is a plan view of the upper part of the liquid cooler to show the relation of the refrigerant inlet and outlet pipes.

Fig. 7 is a view similar to Fig. 1 showing a modified form of the cooling apparatus.

Fig. 8 is a horizontal section taken on the line 8—8 of Fig. 7.

Fig. 9 is an enlarged fragmentary vertical section of a portion of the evaporator for cooling the syrup jar compartment of the fountain of Fig. 7.

Fig. 10 is a view similar to Fig. 1 illustrating a third form of cooling apparatus for the fountain.

Fig. 11 is a horizontal section taken on the line 11—11 of Fig. 10.

Fig. 12 is a fragmentary front elevation illustrating a modification of the apparatus shown in Fig. 10.

Fig. 13 is a view similar to Fig. 1 but illustrating still another form of cooling apparatus for the fountain.

Fig. 14 is a fragmentary vertical section taken on the line 14—14 of Fig. 13.

Fig. 15 is an enlarged transverse sectional view of a portion of the evaporator shown in Fig. 14.

Fig. 16 is a fragmentary elevation showing a modified form of the evaporator of Fig. 14.

Fig. 17 is a sectional view taken on the line 17—17 of Fig. 16.

Figs. 18 and 19 are vertical sectional views showing other modified forms of the evaporator of Fig. 14.

Figure 5:
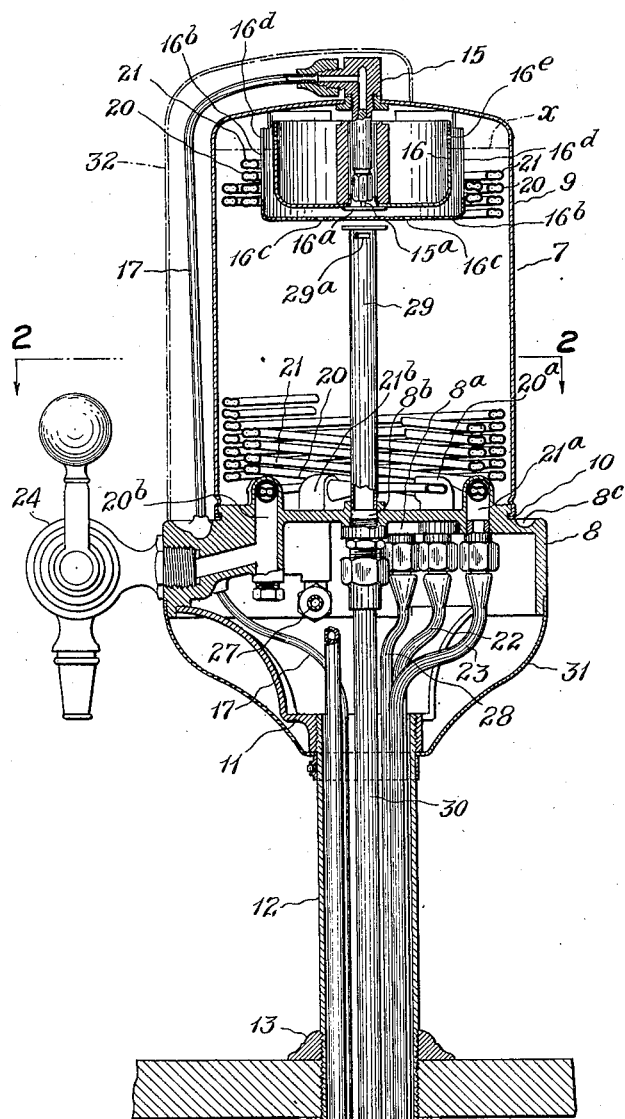
Fig. 5 is an enlarged vertical sectional view of the liquid cooling unit, the section being taken on the line 5—5 of Fig. 2.

My invention, in the specific embodiments illustrated, contemplates a soda fountain having the usual or well known structural features comprising walls forming one or more compartments for the storage of ice cream, bottle goods or other package goods which it may be desired to hold or store under refrigeration, and the usual compartment for syrup jars. Accordingly a detailed description of the structural parts of the fountains illustrated will not be needed.

Referring first to the form of apparatus illustrated in Figs. 1 to 6, it will be noted that the fountain structure illustrated provides a chamber 1 for the storage of ice cream and the like in the usual holding cans (not shown), a storage compartment 2 for holding bottle or other package goods, a compartment 3 for holding the usual syrup jars 4, 4, the compartment 3 extending longitudinally of the fountain at an elevation above the other storage compartments in the usual manner, and that the structure is provided with the usual counter front 5 and counter top 6. It will be understood that the end portions of the fountain which are broken away in Fig. 1 comprise additional storage compartment space, which may be of the same character as that illustrated. For example, the right end of the fountain as viewed in Fig. 1 may provide additional ice cream storage space of the same character as that illustrated, it being customary in the larger size fountains to provide a considerable number of "holes" for ice cream cans.

Prior to my present invention it has been customary, in the case of mechanically refrigerated soda fountains, to cool the soda water, plain water, or other liquids on draft by immersing the cooling coils of the liquids on draft in a tank of water which is cooled, directly or indirectly, by a refrigerant evaporator. It has also been customary to use either the same or other similarly cooled water baths to cool the storage compartment for bottle or other package goods. The use of such water baths for cooling have been found to be open to the objections of sloppiness and the occupation of a relatively large amount of space so that, for a fountain of given size, the storage capacity for goods to be dispensed is correspondingly reduced. Furthermore it has been difficult, if not impossible, to closely regulate the temperature of the liquids on draft and insure that all drinking water or beverages shall be drawn at the temperature desired.

By my present invention all of these objections are overcome by the provision of novel types of cooling apparatus which will now be described. For the effective cooling of the liquids on draft I provide a cooling unit 7 which is of the same general character as the liquid cooling unit disclosed in United States Letters Patent No. 1,985,785 granted upon my application Serial No. 369,669, filed June 10, 1929. The unit 7 comprises an evaporator casing having a base and bottom wall element 8, and a shell 9 which constitutes the sides and top of the casing. The shell 9 has its lower end hermetically joined at 10 to the base 8. The base 8 is supported by a three-armed fitting 11 which in turn is threaded and supported upon a tubular standard 12 that is secured to one of the top walls of the fountain structure by nuts 13 and 14.

Figure 6:
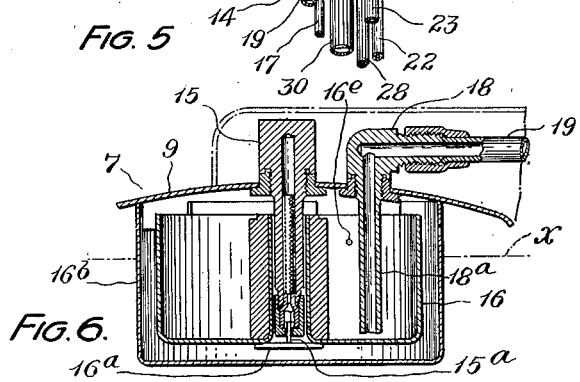
Fig. 6 is an enlarged fragmentary vertical section on the line 6—6 of Fig. 3.

The top wall of the shell 9 is centrally apertured to receive a liquid refrigerant inlet valve fitting 15 which projects into the casing and is surrounded by the central sleeve of an annular cup-shape float 16. Said float carries a plate 16ª which engages the stem 15ª of the inlet valve, so as to close the valve when the float rises and permit the valve to open when it falls, thus maintaining liquid refrigerant in the casing at a suitable level, as indicated by the dotted line x. The float 16 is surrounded by a cup-shape baffle 16ᵇ pressed or stamped from sheet metal. This cup 16ᵇ is rigidly secured at its upper edge to the top wall of the shell 9. The bottom wall of the cup has small perforations 16ᶜ and its side walls narrow slits 16ᵈ through which the refrigerant liquid and vapor may pass. The baffle cup serves to brace the upper portion of the cooling coils 20 and 21 and prevent movement of the coils against the float during shipment of the apparatus; and it also performs an additional function which will later be explained. The float 16 is preferably formed with one or more small drain openings 16ᵉ through its side wall at a level above the normal liquid level x (Figs. 5 and 6). The purpose of these openings 16ᵉ also will be explained later. A liquid refrigerant supply pipe 17 is coupled to the inlet fitting 15. The top wall of the shell 9 is also provided with a refrigerant vapor discharge fitting 18, which carries a tube 18ª that projects downward into the cavity of the float 16 (Fig. 6). A refrigerant vapor discharge or suction pipe 19 is coupled to the fitting 18. The refrigerant pipes 17 and 19 are extended downwardly along the rear side of the shell 9 and pass through apertures in the base 8 and thence downwardly through the standard 12 into the interior compartments of the fountain.

Within the evaporator casing and submerged in the liquid refrigerant therein are a pair of cooling coils 20 and 21. The lower, inlet ends of these two coils 20 and 21 are connected to inlet ducts 20ª and 21ª formed in the base 8, these two ducts having coupled to them supply pipes 22 and 23 for two draft liquids, for example, soda water and plain water, which extend downward through the standard 12 and through the interior of the fountain structure to suitable sources of supply of the said liquids. The two coils 20, 21 are wound in parallel and follow the inner upwardly extending helix to the top of the casing chamber and thence follow the outer downwardly extending helix to the chamber again where the one coil carrying plain water is connected to an outlet duct 20ᵇ of the base 8 while the other coil 21, carrying soda water, is connected to the outlet duct 21ᵇ of the base 8. The base 8 is fitted with a draft faucet 24 which is connected to the outlet duct 20ᵇ for plain water and a pair of draft faucets 25 and 26, the first of which is connected directly to the outlet duct 21ᵇ of the base while the faucet 26 is connected to said outlet duct indirectly by means of the pipe 27.

The casing base 8 is provided with a discharge duct 8ª (Figs. 2 and 5) to which is coupled a pipe 28 which extends downward through the tubular standard 12 to another evaporator which will presently be described. The base 8 is formed with a central aperture 8ᵇ to which is fitted an upstanding pipe 29, the upper end of which terminates a little below the float 16 when the latter is in its normal position and serves to prevent the float from moving off the refrigerant inlet fitting 15 when there is no liquid in the evaporator. At its upper end the pipe 29 is provided with one or more lateral openings 29ª. A pipe 30 is connected by means of suitable fittings with the aperture 8ᵇ and extends downwardly through the standard 12, as shown in Fig. 5.

A sheet metal cover member 31 is preferably fitted to the base 8 and the standard 12 to cover the various pipe fittings and give the cooling unit a more finished appearance. Similarly a sheet metal cover 32 may be provided for the refrigerant tubes 17 and 19 as indicated by the dotted lines in the drawings. The base 8 is formed with a trough 8ᶜ to receive water of condensation that may form on the shell 9.

In the package compartment 2 is arranged an evaporator coil 33 which consists of a length of finned tubing 33ª bent to form a series of U bends which are braced by bars 33ᵇ, 33ᵇ. The said bars are provided with hooks 33ᶜ which engage brackets 34 on the adjacent wall of the compartment and serve to support the evaporator. To the lower end of the evaporator tube 33ª is coupled the lower end of the pipe 28 which thus serves to conduct liquid refrigerant from the cooling unit 7 to the lower inlet end of the evaporator 33. To the upper end of the evaporator tube 33ª is coupled a pipe 30ª which is connected at its upper end to the lower branch of a cross pipe fitting 35 to the upper branch of which is connected the lower end of the tube 30. In front of the evaporator coil 33 is mounted a baffle plate 36, the upper and lower edges of which terminate short of the top and bottom walls, respectively, of the compartment 2 so that the evaporator 33 is in effect mounted in a passage (between the plate 36 and the adjacent parallel wall of the chamber) through which air in the chamber 2 will circulate as it is cooled by the evaporator, thus insuring a uniform cooling of the entire chamber.

Figure 4:
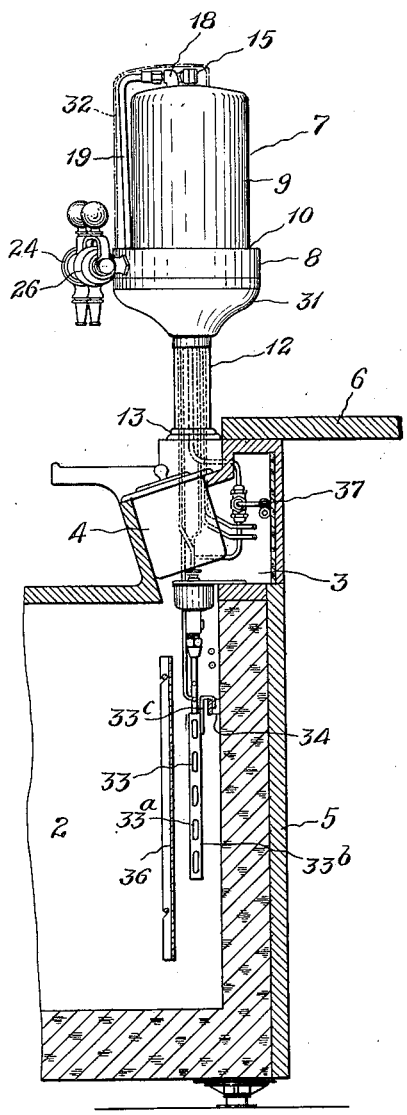
Fig. 4 is a transverse vertical section on the line 4—4 of Fig. 1.

As shown in Figs. 1 and 4, the cross pipe fitting 35 is disposed in the syrup jar compartment 3.

To the two lateral branches of the cross fitting are secured finned tubes 37, 37 which incline slightly downward toward their unattached closed ends. These tubes 37, 37 serve as an evaporator for cooling the syrup jar chamber as will presently be explained.

In the ice cream storage compartment 1 is arranged a flooded evaporator 38 which may be of any known construction suitable for the purpose, such, for example, as the type fitted with a float valve to control the admission of liquid refrigerant and maintain a body of such refrigerant in the evaporator. This evaporator is provided with a liquid refrigerant supply pipe 39 which may be extended to and connected with a suitable refrigerant condensing unit, not shown. The evaporator is also provided with a suction return pipe 40 which is adapted to be connected to the suction inlet of the condensing unit. It is contemplated that, in accordance with the usual practice, the condensing unit, in the form of a compressor and condenser, shall be operated by an electric motor controlled by a switch that automatically starts and stops the motor in a manner to maintain the desired temperature in the evaporator 38. A type of switch commonly employed for this purpose is operated by the pressure in the suction return pipe 40.

The liquid refrigerant supply pipe 17 of the cooling unit 7, after passing through the standard 12, compartments 3 and 2, is coupled to the liquid supply pipe 39, as shown in Fig. 1. Similarly, the vapor return pipe 19 of the unit 8 is extended through the standard 12, compartments 3 and 2 and coupled to the refrigerant suction pipe 40. The passage through the suction return pipe 19 is controlled by a pressure operated valve 41 which closes automatically when the pressure in the evaporator unit 7 falls below a certain value. Valves of this type, being well known and in common use, need not be described in detail. Such a valve is illustrated in my above mentioned copending application Serial No. 369,669. In the present instance the valve 41 is adjustable so as to maintain a higher pressure in the evaporator 7 than that maintained in the evaporator 38 by the automatically intermittent operation of the condensing unit.

In the operation of the apparatus shown in Figs. 1 to 6, liquid refrigerant supplied through the pipe 39 passes through pipe 17 to the top of the cooling unit 7 to which it is admitted under the control of the valve actuated by the open cup-shape float 16. As the interior of the cooling unit 7 is in open communication through the pipes 28 and 30 with the evaporators 33 and 37 into which the liquid refrigerant can flow from the evaporator 7 by gravity, it is obvious that the float actuated valve of the evaporator 7 serves, by its automatic operation, to control admission of liquid refrigerant to all three evaporators. With the system of evaporators charged with liquid refrigerant in this manner, the three evaporators will perform their respective functions as follows: as plain water or soda water is drawn through the faucet 24 or the faucets 25, 26 the relatively warm plain or soda water entering the cooling coil 20 or 21 will cause evaporation of refrigerant in the evaporator 7 with resultant increase of the vapor pressure therein. As soon as this pressure exceeds that necessary to open the control valve 41, vapor is drawn off through the pipes 19 and 40 and is thus returned to the condensing unit. As the draft faucets 24, 25 and 26 have a very direct connection with the submerged cooling coils 20, 21 even the very first liquid drawn from the faucet is certain to be substantially at the predetermined low temperature maintained in the evaporator 7. This result is further insured by the fact that the faucets are mounted directly on the base 8 of the cooling unit so that the faucets themselves are always maintained at a temperature but slightly above that of the cooling unit proper. I have shown the shell 9 of the cooling unit directly exposed to the air and the cool surface of the shell will result in condensation thereon of moisture from the air, thus giving the cooling unit a striking appearance of coolness so as to advantageously attract attention in warm weather.

If, in any case, it is not desirable to take advantage of this feature, it is obvious that the cooling unit can be covered with suitable insulating material.

The package storage compartment 2 is meanwhile maintained at a suitable low temperature by the evaporator 33. The air in the compartment 2 coming in contact with the evaporator 33 flows downward between the baffle plate 36 and the adjacent wall of the compartment and a continuous circulation is thus maintained in the compartment 2 to keep it cool. As liquid refrigerant in the flooded evaporator 33 is vaporized the vapor passes upward through the pipes 30ª, fitting 35, pipes 30 and 29 into the interior of the evaporator 7, and finally finds its way out of the latter evaporator through the pipe 19 as previously described. By making the evaporator 33 of suitable size and capacity, the compartment 2 can be held at a desired temperature within the limit prescribed by the vapor pressure determined by the control valve 41.

In a similar manner the evaporator tubes 37, 37 serve to maintain the syrup jar compartment 3 at a suitable low temperature desirable for the syrups and crushed fruits that may be used for flavoring ice cream soda, sundaes, etc. As evaporation of the liquid refrigerant in the flooded tubes 37 occurs, the vapor formed rises to the upper sides of said tubes and because of the inclination of the latter finds its way into the fitting 35 and thence upward through the pipes 30 and 29 into the casing of the cooling unit 7, whence the vapor passes out through the pipe 19 in the manner previously described.

Ebullition of the liquid refrigerant in the cooling unit 7 incident to evaporation of the refrigerant, causes the liquid to rise above its normal level $x$ with the result that lubricant in the body of liquid is caused to overflow the rim of the float and pass into the cavity thereof, to be drawn, together with the evaporated refrigerant, back to the compressor. This action is explained in detail in my application Serial No. 369,669 previously mentioned. As the upper evaporator 7 is called upon to handle all of the refrigerant for the three evaporators 7, 33 and 37, it results that when vapor is being generated in all three of said evaporators at the same time, the volume of gaseous refrigerant generated in or entering the upper evaporator is relatively large. The baffle cup 16ᵇ insures that the turbulence resulting from such large amount of vapor rising through the liquid refrigerant in the shell 9 shall not project liquid refrigerant, as well as lubricant, over the top of the float 16. At the same time the drain opening 16ᵉ in the float 16 insures that at least a small amount of lubricant will enter the float during periods of very moderate turbulence in the evaporator 7.

Referring now to the form of apparatus shown in Figs. 7, 8 and 9, it will be noted that a fountain structure is illustrated of the same general character as that previously described, there being an ice cream compartment 42, which may be cooled by a suitable evaporator (not shown) such as that illustrated at 38 in Fig. 1, a package storage compartment 43 and a compartment 44 to hold the syrup jars 45. The fountain is fitted with a draft arm 46 for plain water and two draft arms 47, 47 for soda water or other beverage, said draft arms being mounted on a metal wall section 44ª of the compartment 44.

In the package compartment 43 is arranged a cooling unit 48 for cooling the liquids on draft. This unit is of the same general character as the cooling unit 7 of the fountain first described and comprises a shell or casing 49 to hold liquid refrigerant admitted through a liquid refrigerant supply pipe 50 which is coupled to a pipe 51 that in turn is connected with a refrigerant condensing unit (not shown) and which is intended to be extended into the ice cream compartment to supply liquid refrigerant to the evaporator thereof above referred to but not shown in the drawings. Entrance of liquid refrigerant from the pipe 50 into the casing 49 is controlled by a valve actuated by a float 52, the valve and float being of the same character as the corresponding parts of the cooling unit 7. The casing 49 is fitted with a refrigerant vapor discharge or suction pipe 53 which is coupled to the suction pipe 54 that in turn is connected to the suction side of the said refrigerant condensing unit. The passage of vapor through the pipe 53 is controlled by an automatic valve 55, similar to the valve 41 of the first fountain. It is assumed that the operation of the motor driven condenser unit will be controlled by an automatic switch as described in connection with the first fountain.

Within the evaporator casing 49 are liquid cooling coils 56 and 57 which are wound in parallel in the same manner as the cooling coils of the unit 7 except that the ends of the coils are at the top of the evaporator instead of at the bottom of it. The inlet ends of said coils are connected with the water and soda water supply pipes 58 and 59, respectively, and the outlet ends of said coils with the pipes 60 and 61, respectively. The pipe 60 leads to and is operatively connected with the draft arm 46 while the pipe 61 leads to one of the draft arms 47 and has a branch pipe 61ª leading to the other of said draft arms 47.

The evaporator 48 is supported from the fountain walls by a bracket 62 upon which the evaporator rests and by a band 63 which passes around the evaporator casing and engages a bracket arm 64 (Fig. 8) secured to the fountain wall.

While the evaporator 48 will absorb considerable heat from the package compartment 43, its exposed surface would not ordinarily be great enough alone to effect the desired cooling of said compartment. I, therefore, provide an additional evaporator 65 which is formed of finned tubing and constructed and supported in the same manner as the evaporator 33 of the first described fountain. The lower end of the evaporator 65 is connected by a pipe 65ª with the lower part of the casing 49 of evaporator 48 and the upper end of evaporator 65 is connected to the upper part of said casing 49 by pipe 65ᵇ which communicates with the interior of casing 49 at a point slightly above the liquid refrigerant level therein. With the evaporator 65 thus connected it is filled with liquid refrigerant by gravity from the evaporator 48. The combined surfaces of the evaporators 49 and 65 are thus made available for the cooling of the compartment 43. A continuous circulation of the air in the compartment 43 over the cooling surfaces is secured by the provision of a baffle plate 43ª which terminates short of the top and bottom walls of the compartment in the same manner as does the baffle plate 36 in the first described fountain.

For the cooling of the syrup jar compartment 44 I provide an elongated evaporator 66 formed of finned tubing. This evaporator includes a T-fitting 67 by which the evaporator is connected through a vertically arranged section of finned tubing 68 with the lower part of the evaporator 65. As shown in Fig. 9, the tube 68 extends upward nearly across the horizontal bore of the fitting 67. As the lower half of the finned tube 68 will be filled with liquid refrigerant from the evaporator 65, evaporation of such refrigerant in said tube will occur with resultant formation of bubbles of gas or vapor which will rise in the tube and carry more or less liquid with them, as indicated in Fig. 9, the action being more or less like that occurring in a coffee percolator. Liquid refrigerant is thus lifted from the evaporator 65 and discharged into the evaporator 66. This operation is dependent upon the fact that the conduit 68 is exposed to an atmosphere from which it absorbs heat or, in other words, an atmosphere at a higher temperature than that corresponding to the refrigerant pressure in the conduit. The T-fitting 67 is arranged at the highest point of said evaporator. Hence, with the construction illustrated in Fig. 9, the liquid refrigerant discharged into the evaporator 66 is trapped therein and distributed throughout the length of the evaporator and thus made effectively available for evaporation and the cooling of the syrup jar compartment. To handle the refrigerant evaporated in the evaporator 66, the latter is connected in the manner shown in Fig. 7 by means of a tube 69 with a T-fitting 70 which serves to connect the upper end of the evaporator 65 to the tube 65ᵇ. The vapor space of the evaporator 66 is thus connected through tube 69, fitting 70 and pipe 65ᵇ with the vapor space of the evaporator 48.

In the operation of this second form of fountain it will be understood that the ice cream compartment is cooled by the evaporator referred to, but not shown in the drawings, in the same manner as is the ice cream compartment of the first described fountain. As the liquids on draft are drawn through the cooling coils 56 and 57 of the evaporator 48 they are maintained at predetermined low temperatures by the action of the control valve 55 in the suction return pipe 53. As the pipes 60 and 61 leading from the evaporator 48 to the draft arms are relatively short and as they are enclosed in the cooled compartments 43 and 44, and as the draft arms themselves are mounted directly upon the metal wall section 44ª of the compartment 44 and are thus cooled by conduction, the draft liquids are discharged from the draft faucets at temperatures but slightly higher than the temperatures maintained in the evaporator 48.

It will be understood that the operation of the evaporator 48 in conjunction with the condensing unit (not shown) and under the control of the automatic valve 55 is similar to that of the cooling unit 7 of the first described fountain.

As previously stated the compartment 43 is cooled by the evaporators 48 and 65 and it is obvious that the refrigerant evaporated in the evaporator 65 finds its way from the top of said evaporator into the upper, vapor space of the evaporator 48.

The syrup jar compartment 44 is cooled by its evaporator 66 in a manner previously explained, receiving liquid refrigerant from the evaporator 65 and delivering its evaporated refrigerant in a manner previously described into the vapor space of the evaporator 48.

Thus, as in the first described fountain, the single automatically operating float valve in the liquid cooling evaporator serves to control admission to the other evaporators, though in conjunction with the percolator action in the case of evaporator 66, and refrigerant evaporated in the liquid cooling evaporator, bottle compartment evaporator and the syrup jar compartment evaporator is all conducted from the vapor space of the liquid cooling evaporator through the common suction pipe 53.

The fountain illustrated in Figs. 10 and 11 is in many respects similar to that last described so that the construction and operation will be readily understood with but a brief description of many of the parts. 71 is the usual ice cream compartment which is designed to be cooled in the same manner as the fountains already described, 72 is the storage compartment for bottles or other package goods and 73 the compartment for the syrup jars 74, the compartment 73 having a metallic wall section 73ª upon which are mounted a draft arm 75 for plain water and draft arms 76, 76 for soda water or other beverage. An evaporator 77 for cooling the liquids on draft is disposed in the package compartment 72 and comprises a casing 78 in which are a pair of coils 79, 80 wound in parallel from the bottom of the casing to the top thereof, the lower ends of the coils being connected with pipes 81 and 82 which lead to sources of supply of the liquids on draft, while the upper ends of the coils 79 and 80 are connected to the pipes 83 and 84, the former of which is connected to the draft arm 75 and the latter to draft arms 76, 76. In a manner which will presently be described, the evaporator casing 78 is flooded with liquid refrigerant so as to submerge the cooling coils 79 and 80.

As in the last previously described fountain, the liquid cooling evaporator serves to at least partially cool the compartment 72 but to secure adequate cooling capacity the additional finned tube evaporator 85 is provided, the lower end of said evaporator being connected by a pipe 86 with the lower part of the evaporator casing 78 while the upper end of the evaporator 85 is connected by a pipe 87 with the upper part of the casing 78. The evaporator 78 is supported on a base bracket 88 and is further secured by a band 89 which engages the bracket arm 90. The evaporator 85 is supported by brackets 91, 91.

The syrup jar compartment 73 is cooled by an evaporator designated in its entirety by 92 and comprising a liquid refrigerant float casing 93 and finned tubes 94, 94 which extend from the casing 93 and communicate with the interior thereof at a level slightly below the liquid level therein. The casing 93 is provided with an inlet valve 95 and a float 96 for actuating the same. A liquid refrigerant supply pipe 97 is connected to the float valve fitting. The casing 93 is also provided with a suction discharge fitting 99 to which is connected the suction discharge pipe 100 which is fitted with an automatic pressure-operated control valve 101 to maintain the desired vapor pressure in the casing 93. The liquid refrigerant pipe 97 and the suction discharge pipe 100 are, respectively, connected with the liquid refrigerant pipe 102 and the suction return pipe 103 which are adapted to be connected to a condensing unit and an ice cream compartment evaporator (these latter parts not shown) in the manner described in connection with the first described fountain. The float actuated valve of the evaporator 92 and the suction discharge fittings thereof are of the same character as the corresponding parts of the evaporator 7 of the first described fountain. The finned tubes 94, 94 of the evaporator 92 are inclined slightly downwardly and away from the casing 93 so that when liquid refrigerant in said tubes evaporates the vapor will rise to the top of said tubes and readily find its way into the casing 93.

For the purpose of supplying liquid refrigerant to the evaporators 77 and 85, I provide a pipe 104 which is connected at its upper end to the bottom of the evaporator casing 93 and at its lower end to a T-fitting 105 which is connected with the lower end of the evaporator 85 and with the pipe 86 which leads into the lower part of the casing of evaporator 77. A pipe 106 is connected at its upper end to one of the evaporator tubes 94 and at its lower end with the upper end of evaporator casing 78 and by means of a branch 106ª with pipe 87 and these pipe connections serve to return refrigerant evaporated in the evaporators 77 and 85 to the vapor space of the upper evaporator 92 whence the vaporized refrigerant is withdrawn through the common suction discharge 100.

A vertical baffle plate 107 is mounted adjacent the evaporators 77 and 85 in the bottle compartment 72 to ensure effective circulation of the air in said compartment and the uniform cooling thereof, the baffle plate terminating short of the bottom and top walls of the compartment as in the case of the corresponding baffles of the previously described fountains.

The operation of the cooling apparatus of this last described fountain will be understood from the foregoing description of the construction taken with the description that has been given of the previous fountains.

In Fig. 12 I have shown a modification of the fountain shown in Figs. 10 and 11. In this modification the cooling apparatus in the compartment 72 of Fig. 10 remains unchanged but the evaporator for the syrup jar compartment 73 and the liquid draft means are modified. In place of the float casing 93 I provide a liquid refrigerant float casing 108 comprising a base 108ª and a shell 108ᵇ mounted thereon, the base in turn being supported upon a tubular standard 109. On the top of the shell 108ᵇ is mounted an inlet valve fitting 110, the valve of which is actuated by the float 111. The top of the shell 108ᵇ also carries a suction discharge fitting 112. The inlet valve, float and discharge fitting are of the same character as the corresponding parts of the evaporator 7 of the first described fountain. The liquid supply line 97 and the suction discharge line 100 are extended upward through the tubular standard 109 and the base 108ª and are respectively connected to the fittings 110 and 112. The liquid refrigerant pipe 104 is extended upward through the standard 109 and connected to an aperture through the base of 108ª so as to communicate with the interior of the casing 108. On the base 108ª are mounted a draft faucet 113 for plain water and two draft faucets 114, 114 for soda water or other beverage (one of the latter faucets being broken away). The liquid supply lines 83 and 84 are extended upward through the standard 109 and the former connected to the draft faucet 113 and the latter to the faucets 114. A pipe 115 is connected at its upper end to an aperture in the base 108ª so that the upper end of said pipe communicates with the interior of the casing 108 while its lower end is connected to the top branch of a fitting 116, to the side branches of which are connected the ends of the evaporator tubes 94, 94 for cooling the syrup jar compartment 73. To the lower branch of the fitting 116 is connected the upper end of the pipe 106.

It will be seen that the modification of the fountain illustrated in Fig. 12 operates in substantially the same manner as that illustrated in Figs. 10 and 11 but at the same time possesses certain of the advantages of the first described fountain incident to the elevation of the liquid refrigerant float valve above the counter top or top wall of the fountain. In the construction of Fig. 12, as in the case of that shown in Fig. 10, liquid refrigerant flows by gravity from the float valve casing into all three evaporators so as to flood the latter, and evaporator tubes 94, 94 being supplied with liquid refrigerant through the pipe 115 which also serves to conduct refrigerant vapor upward from the two evaporators 77 and 85 as well as the evaporator tubes 94, to the vapor space of the float casing 108. The operation of the cooling apparatus modified according to Fig. 12 is substantially the same as that illustrated in Fig. 10, but the modified apparatus has certain of the advantages of the first described fountain, particularly the exposure to view of the cooled metal surfaces of the casing 108 and the mounting of the draft faucets 113, 114 directly thereon so that they are very effectively cooled.

In the fountain illustrated in Figs. 13 and 14, the structural parts of the fountain are of the same general character as those already described, there being a compartment 117 for ice cream or the like, a compartment 118 for bottles or other package goods, a compartment 119 for syrup jars, a draft arm 120 for plain water and two draft arms 121, 121 for soda water or other beverage, the draft arms being mounted on a metallic wall section 119ª of the compartment 119.

In the syrup jar compartment 119 is an evaporator designated in its entirety by 122. This evaporator comprises a central cylindrical casing 123 and two tubular arms 124, 124ª which extend from the casing 123 and communicate with the interior thereof. The casing 123 is provided with an inlet valve 125 actuated by a float 126 and is also provided with a suction discharge fitting 127. A liquid refrigerant pipe 128 is connected to the inlet valve 125 and a suction discharge pipe 129 is connected to the discharge fitting 127. The discharge through the pipe 129 is controlled by a valve 130 which is automatically actuated by pressure as in the case of the fountains previously described. The pipes 128 and 129 are, respectively, connected to the liquid supply line 131 and suction line 132 which are adapted to extend from a refrigerant condensing unit to an evaporator in the ice cream compartment 117 (these latter parts not shown). The float actuated valve 125 is adapted to admit the liquid refrigerant to the evaporator 122 and maintain the latter in a flooded condition. The tubular arms 124 and 124ª of said evaporator are made large enough to receive liquid cooling coils, the arm 124 being fitted with a coil 133, the inlet end of which is connected with a pipe 134 leading to a supply of plain water while the outlet end is connected to the pipe 135 leading to the draft arm 120. Similarly, the arm 124ª is fitted with a cooling coil 136, the inlet end of which is connected to a pipe 137 leading to a source of supply of soda water or other beverage, while the discharge end thereof is connected by pipes 138 and 139 to the two draft arms 121.

In the bottle compartment 118 is arranged an evaporator coil 140 formed of finned tubing and constructed and supported in the same manner as the similar evaporators of the fountains already described. A liquid refrigerant pipe 141 leads from the bottom of the casing 123 of the other evaporator 122 to the bottom opening of the evaporator 140 and the top of said evaporator is connected by a pipe 142 with the under side of arm 124ª of the evaporator 122. Liquid refrigerant flows by gravity from the casing 123 through pipe 141 into the evaporator 140 so as to flood the latter while refrigerant vapor rising through the coils of the evaporator 140 is permitted to pass upward through the pipe 142 into the upper evaporator 122 and thence out through the suction discharge pipe 129.

The operation of the last described apparatus will be clear, it is believed, without further description, the operation being generally similar to that of the other fountains which have been described. While the cooling capacity of the evaporator 122 is greater than that required for the syrup jar compartment, this excess capacity need not be lost as a communicating opening can be provided between the compartment 119 and the lower compartment 118 so that the air cooled in the upper compartment will flow downwardly into the lower compartment, the cooling effect of the evaporator 140 thus being supplemented by the excess capacity of the evaporator 122.

In the case of each of the fountains which has been described the liquid cooling evaporator has the liquid refrigerant in direct contact with the cooling coils. It is obvious, insofar as certain of the broader aspects of my invention are concerned, that a heat exchange relation between the conduits or containers of the liquid to be cooled and the liquid refrigerant can be secured in other ways, as by having the metallic wall of the conduit or container for the liquid to be cooled in direct metallic contact with the evaporator casing or liquid refrigerant container. Figs. 16 and 17 show a modification of the evaporator 122 of Fig. 13 in which the tubular arm 124' of the refrigerant casing has a coil 133' for liquid to be cooled, thereon, and maintained in intimate contact therewith as by dipping in solder or the like. A fairly good heat exchange relation between the liquid refrigerant in the arm 124' and the liquid to be cooled in the coil 133' is thus secured.

Another way of attaining the same object is illustrated in Fig. 18 where the tubular arm 124" of the evaporator is given a semi-circular outline and a conduit 133" of similar form is held in direct contact therewith, the cylindrical body thus formed by the two parts is surrounded by fins 143 which serve the several purposes of binding the tubular parts together, increasing the capacity of the heat flow paths between the liquids in the two tubes, and increasing the surfaces through which the tube 124" can absorb heat from the surrounding air. The tubular parts 124" and 133" can, of course, be soldered together.

The construction shown in Fig. 19 is similar to that of Fig. 18 except that the liquid refrigerant tube 124"' has a sector shape in section adapting it to fit two similarly shaped tubes 133"' and 136', the former for plain water and the latter for soda water or other beverage. All three tubes are surrounded by fins 144.

The cup-shape baffle (16b) of the liquid cooling unit 7 of the first fountain can be used, if desired, in connection with the open floats of the cooling apparatus of the other fountains.

While the several fountains which are illustrated and described differ in various respects, they have certain features in common. Thus in each of the fountains the several evaporators provided for the cooling of the liquids on draft and of the bottle storage and syrup jar compartments have the admission of liquid refrigerant thereto controlled by a single automatically operating float valve, except that in the case of the fountain shown in Fig. 7 the admission of the liquid refrigerant to the evaporator in the syrup jar compartment is also controlled by the percolator effect. This latter, however, is secured without the use of any working mechanism so that even in the case of the fountain in Fig. 7 the single float valve is the only working mechanism provided to control the admission of liquid refrigerant to the several evaporators. Furthermore, in the case of each of the fountains described a single suction control pipe serves to conduct to the condensing unit the refrigerant evaporated in all of the evaporators in question. This, of course, is made possible by the fact that it is desirable to maintain substantially the same temperatures for the liquids on draft and the bottle storage and syrup jar compartments. In other words, great simplicity of the refrigerant control devices is secured.

In the case of each of the fountains very effective uniform cooling of the liquids on draft is secured not only because of the instantaneous direct heat exchange type of cooling unit employed but also because of the relatively short and direct connection between the liquid cooling coils and the draft faucets and because, in the case of the fountains in which the liquid cooling unit is in one or another of the compartments below the counter top of the fountain, the tubes conducting the liquids on draft from the cooling unit to the draft arms pass through the adequately cooled spaces.

Of course, the utmost effectiveness and uniformity in the cooling of the liquids on draft is attained in the case of the first described fountain in which the liquid cooling unit 7 has the draft faucets mounted directly on the base of the evaporator so that the shortest and most direct connection possible is secured between the cooling coils and the faucets and the latter are themselves kept adequately cooled by their direct mounting on the evaporator structure. These latter advantages are in a measure attained by the form of construction shown in Fig. 12, although in this latter construction the connection between the cooling coils and the draft faucets is not so direct.

While I have illustrated and described several different forms of construction, it will be understood that my improvements can be embodied in various other forms of construction without departing from the invention as defined in the appended claims.

What I claim is:

1. In dispensing apparatus, the combination of draft means for dispensing liquid; walls forming a storage compartment for package goods; means for cooling the liquid on draft comprising a flooded refrigerant evaporator and a section of conduit for the liquid on draft in heat exchange relation with the liquid refrigerant in said evaporator; means for cooling the storage compartment comprising a flooded evaporator disposed in said compartment; a single automatic valve for controlling admission of liquid refrigerant to said evaporators; and a suction conduit through which refrigerant vapor is withdrawn from both of said evaporators.

2. In a soda fountain or the like, the combination of draft means for dispensing liquid; walls forming a storage compartment for package goods and a compartment for syrup jars; means for cooling the liquid on draft comprising a flooded evaporator and a section of conduit for the liquid on draft in heat exchange relation with the liquid refrigerant in said evaporator; means for cooling the package compartment comprising a flooded evaporator disposed in said compartment; a single automatic valve for controlling admission of liquid refrigerant to said evaporators; an evaporator in the syrup jar compartment for cooling the same, said evaporator being connected to receive some of the liquid refrigerant passed through the said automatic valve; and a suction conduit through which refrigerant vapor is drawn from all of said evaporators.

3. In dispensing apparatus, the combination of draft means for dispensing liquid; walls forming a storage compartment for package goods; means for cooling the liquid on draft comprising an evaporator casing, a float valve therein for admitting liquid refrigerant and automatically maintaining a body of such refrigerant in the casing and a section of conduit for the liquid on draft submerged in the liquid refrigerant in said casing; means for cooling the package compartment comprising a flooded evaporator disposed in said compartment and connected with the first named evaporator to receive liquid refrigerant therefrom by gravity; and a suction conduit through which refrigerant vapor is drawn from both of said evaporators.

4. In a soda fountain or the like, the combination of draft means for dispensing liquid; walls forming a storage compartment for package goods and a compartment for syrup jars; means for cooling the liquid on draft comprising a flooded evaporator and a section of conduit for the liquid on draft submerged in the liquid refrigerant in said evaporator; means for cooling the package compartment comprising a flooded evaporator disposed therein; and a flooded evaporator disposed in the syrup jar compartment; means for admitting liquid refrigerant to the three evaporators comprising a float actuated valve arranged to maintain the level of the liquid refrigerant on the discharge side of said valve at a level high enough to feed all of the said evaporators by gravity; and a suction conduit through which refrigerant vapor is drawn from all of said evaporators.

5. In a soda fountain or the like, the combination of draft means for dispensing liquid; walls forming a storage compartment for package goods and a compartment for syrup jars; means for cooling the liquid on draft comprising an evaporator casing, a float valve therein for admitting liquid refrigerant and automatically maintaining a body of such refrigerant in the casing and a section of conduit for the liquid on draft submerged in the liquid refrigerant in said casing; means for cooling the package compartment comprising a flooded evaporator disposed in said compartment and connected with the first named evaporator to receive liquid refrigerant therefrom by gravity; an evaporator in the syrup jar compartment arranged to receive liquid refrigerant from the first named evaporator by gravity; and a suction conduit through which refrigerant vapor is drawn from all of said evaporators.

6. In a soda fountain or the like, the combination of walls forming a compartment for the storage of ice cream and the like and a storage compartment for package goods; means for cooling the ice cream compartment comprising a refrigerant evaporator, a conduit adapted to conduct liquid refrigerant to said evaporator from suitable refrigerant condensing means and a suction conduit adapted to conduct refrigerant vapor from the evaporator back to such condensing means; draft means for dispensing liquid; means for cooling the liquid on draft comprising a flooded evaporator and a section of conduit for the liquid on draft in heat exchange relation with the liquid refrigerant in said evaporator; means for cooling the package compartment comprising a flooded evaporator disposed in said compartment; a single automatic valve for controlling admission of liquid refrigerant to the second and third evaporators; a branch suction conduit through which refrigerant vapor is withdrawn from the second and third evaporators into the first named suction conduit; and a control valve in the branch suction conduit for maintaining a higher vapor pressure in the second and third evaporators than that in the first evaporator.

7. In a soda fountain or the like, the combination of walls forming a compartment for the storage of ice cream or the like, a storage compartment for package goods and a compartment for syrup jars; means for cooling the ice cream compartment comprising a refrigerant evaporator, a conduit adapted to conduct liquid refrigerant to said evaporator from a suitable refrigerant condensing means and a suction conduit adapted to conduct refrigerant vapor from the evaporator back to such condensing means; draft means for dispensing liquid; means for cooling the liquid on draft and the package compartment comprising a flooded evaporator having automatic means for admitting liquid refrigerant thereto and a section of conduit for the liquid on draft in heat exchange relation with the liquid refrigerant in said evaporator; a refrigerant evaporator in the syrup jar compartment for cooling the same, said evaporator being connected with the flooded evaporator to receive liquid refrigerant therefrom; a branch suction conduit through which refrigerant vapor is withdrawn from the second and third evaporators into the first named suction conduit; and a control valve in the branch suction conduit for maintaining a higher vapor pressure in the second and third evaporators than that in the first evaporator.

8. In dispensing apparatus, the combination of structural parts forming storage compartments and a counter top; and means for cooling and dispensing liquid on draft comprising an evaporator casing disposed above the counter top, a float valve in the casing for admitting liquid refrigerant thereto, means for conducting vaporized refrigerant from the casing, a section of conduit for the liquid on draft in heat exchange relation with the liquid refrigerant in the evaporator, and draft means mounted on the evaporator for controlling the flow of liquid through said conduit.

9. In dispensing apparatus, the combination of structural parts forming storage compartments and a counter top; and means for cooling and dispensing liquid on draft comprising an evaporator casing disposed above the counter top, a float valve in the casing for admitting liquid refrigerant thereto, means for conducting vaporized refrigerant from the casing, a section of conduit for the liquid on draft emersed in the liquid refrigerant in the casing, and draft means mounted on the evaporator for controlling the flow of liquid through said conduit.

10. In dispensing apparatus, the combination of structural parts forming a storage compartment for package goods and a counter top; draft means for dispensing liquid; means for cooling the liquid on draft comprising casing means for holding liquid refrigerant, a float valve for admitting liquid refrigerant into the casing means and maintaining the liquid refrigerant at a predetermined level therein, and a section of conduit for the liquid on draft in heat exchange relation with the said liquid refrigerant, the casing means enclosing the float valve being disposed above the counter top and the draft means being mounted thereon; means for cooling the package compartment comprising a flooded evaporator disposed therein and connected with the aforesaid casing means to receive liquid refrigerant therefrom by gravity; and a suction conduit through which refrigerant vapor is withdrawn from the said casing means and evaporator.

11. In dispensing apparatus, the combination of structural parts forming storage compartments and a counter top; draft means for dispensing liquid; and means for cooling the liquid on draft comprising casing means for holding liquid refrigerant, a float valve for admitting liquid refrigerant into the casing means and maintaining the liquid refrigerant therein at a predetermined level, a suction conduit through which refrigerant vapor is withdrawn from the said casing means, and a section of conduit for the liquid on draft arranged to have heat exchange relation with liquid refrigerant admitted into the casing means by the float valve, the casing means enclosing the float valve being disposed above the counter top and the said draft means being mounted thereon.

12. In a soda fountain or the like, the combination of structural parts forming a storage compartment for package goods and a compartment for syrup jars and a counter top; draft means for dispensing liquid; means for cooling the liquid on draft comprising casing means for holding liquid refrigerant, a float valve for admitting liquid refrigerant to the casing means and maintaining the refrigerant therein at a predetermined level, and a section of conduit for the liquid on draft arranged to have heat exchange relation with liquid refrigerant admitted into the casing means by the float valve, the casing means enclosing the float valve being disposed above the counter top and the draft means being mounted thereon; means for cooling the package and syrup jar compartments comprising flooded evaporators disposed therein and connected with the aforesaid casing means to receive liquid refrigerant therefrom by gravity; and a suction conduit through which refrigerant vapor is drawn from the said casing means and evaporators.

13. In liquid cooling means for dispensing apparatus, the combination of an evaporator casing comprising a base formed with inlet and outlet passages for liquid to be cooled and a shell mounted on the base and forming the side and top walls of the casing, the shell being formed with an inlet for liquid refrigerant and an outlet for evaporated refrigerant; a float actuated valve in the casing for admitting liquid refrigerant thereto and maintaining a body of liquid refrigerant therein at a predetermined level; a cooling coil submerged in the liquid refrigerant in the shell with its ends connected respectively to the inlet and outlet passages in the base; and draft means mounted on the base to control discharge of liquid through the said outlet passage.

14. In dispensing apparatus, the combination of draft means for dispensing liquid; walls forming a storage compartment for package goods; means for cooling the liquid on draft and the package compartment comprising an evaporator casing disposed in said package compartment and having an inlet for liquid refrigerant and an outlet for evaporated refrigerant; a float in the casing for controlling admission of liquid refrigerant thereto and maintaining the liquid refrigerant therein at a predetermined level, a section of conduit for the liquid on draft submerged in the liquid refrigerant in the evaporator casing, and an evaporator coil in the package compartment connected to the said evaporator casing to receive liquid refrigerant therefrom and discharge refrigerant vapor thereto.

15. In a soda fountain or the like, the combination of walls forming a storage compartment and a compartment for syrup jars at an elevation above that of the storage compartment; a flooded refrigerant evaporator in the storage compartment; an evaporator in the syrup jar compartment, and connections between the two evaporators comprising a conduit extending upward from the lower evaporator in the storage compartment to the evaporator in the syrup jar compartment, said conduit having its lower end opening into the liquid refrigerant space of the lower evaporator and being exposed to a surrounding atmosphere having a higher temperature than that corresponding to the normal refrigerant pressure in the conduit and being adapted by the absorption of heat through its walls to cause ebullition of refrigerant therein and resultant elevating of liquid refrigerant from the flooded evaporator in the storage compartment to the evaporator in the syrup jar compartment.

16. In a soda fountain or the like, the combination of draft means for dispensing liquid; walls forming a storage compartment for package goods and a compartment for syrup jars, the latter compartment being at a level above that of the former compartment; means for cooling the liquid on draft and the package storage compartment comprising a flooded evaporator in the package compartment having means for maintaining a body of liquid refrigerant therein, means for conducting refrigerant vapor therefrom and a section of conduit for the liquid on draft in heat exchange relation with the liquid refrigerant in the said evaporator; a refrigerant evaporator in the syrup jar compartment; a conduit extending from the flooded evaporator upward to the evaporator in the syrup jar compartment, said conduit being adapted by absorption of heat through its walls to cause ebullition of refrigerant therein and resultant lifting of liquid refrigerant from the evaporator in the storage compartment to the evaporator in the syrup jar compartment; and a conduit connecting the vapor spaces of the two evaporators.

17. In a soda fountain or the like, the combination of walls forming storage compartments including a compartment for package goods and a compartment for syrup jars, the latter compartment being disposed at a level above that of the package compartment; cooling means for the fountain comprising an evaporator disposed in the syrup jar compartment and having an evaporator casing with an inlet for liquid refrigerant and an outlet for vaporized refrigerant and a float valve in the casing for controlling the admission of liquid refrigerant thereto; and an evaporator in the package compartment connected to receive liquid refrigerant from the first named evaporator by gravity and to return its vaporized refrigerant to the first named evaporator.

18. In a soda fountain or the like, the combination of walls forming storage compartments including a compartment for package goods and a compartment for syrup jars, the latter compartment being disposed at a level above that of the package compartment; cooling means for the fountain comprising an evaporator casing with an inlet for liquid refrigerant and an outlet for vaporized refrigerant and a float valve in the casing for controlling the admission of liquid refrigerant thereto; an evaporator in the package compartment connected to receive liquid refrigerant from the first named evaporator by gravity and to return its vaporized refrigerant to the first named evaporator; and means for cooling liquid on draft comprising a section of conduit for the said liquid in heat exchange relation to the liquid refrigerant in one of the two evaporators.

19. In liquid cooling means for dispensing apparatus, the combination of an evaporator casing comprising a base formed with inlet and outlet passages for liquid to be cooled and a shell mounted on the base and forming the side and top walls of the casing; means for maintaining a body of liquid refrigerant in the casing comprising means for admitting liquid refrigerant into said casing and means for discharging vaporized refrigerant therefrom; a cooling coil submerged in the liquid refrigerant in the casing with its ends connected respectively to the inlet and outlet passages in the base; and draft means mounted on the base to control discharge of liquid through said outlet passage.

20. In liquid cooling means for dispensing apparatus, the combination of an evaporator casing comprising a base formed with inlet and outlet passages for liquid to be cooled and a shell mounted on the base and forming the side and top walls of the casing; means for maintaining a body of liquid refrigerant in the casing comprising means for admitting liquid refrigerant into said casing and means for discharging vaporized refrigerant therefrom; a cooling coil submerged in the liquid refrigerant in the casing with its ends connected respectively to the inlet and outlet passages in the base; and draft means to control the discharge of liquid through the said outlet passage.

21. In liquid cooling means for dispensing apparatus, the combination of an evaporator casing comprising a base formed with inlet and outlet passages for liquid to be cooled and a shell mounted on the base and forming the side and top walls of the casing; means for maintaining a body of liquid refrigerant in the casing comprising means for admitting liquid refrigerant into said casing and means for discharging vaporized refrigerant therefrom; means for containing liquid to be cooled disposed in the casing in communication with the inlet and outlet passages in the base and in heat exchange relation with the liquid refrigerant in the casing; and draft means mounted on the base to control discharge of liquid through the said outlet passage.

22. In dispensing apparatus, the combination of main structural parts forming storage compartments and a countertop; and means for cooling and dispensing liquid on draft comprising an evaporator casing disposed above the countertop, means associated with the casing for admitting liquid refrigerant thereto and maintaining a body of liquid refrigerant therein, means for conducting vaporized refrigerant from the casing, means in the casing for holding liquid on draft in heat exchange relation with the liquid refrigerant in said casing, and means mounted on the evaporator casing for controlling the flow of the liquid on draft.

23. In liquid cooling means for dispensing apparatus, the combination of an evaporator casing comprising a base formed with inlet and outlet passages for liquid to be cooled and a shell mounted on the base and forming the side and top walls of the casing; metal-walled means for containing liquid to be cooled disposed in the casing in communication with the inlet and outlet passages in the base; means for admitting liquid refrigerant into the casing in direct contact with the metal-walled means; means for discharging vaporized refrigerant from the casing; and draft means mounted on the base to control discharge of liquid through the said outlet passages.

24. In dispensing apparatus, the combination of main structural parts forming storage compartments and a countertop; and means for cooling and dispensing liquid on draft comprising an evaporator casing disposed above the countertop; metal-walled means within the casing for containing liquid on draft, means for admitting liquid refrigerant into the casing in direct contact with said metal-walled means, means for conducting vaporized refrigerant from the casing, and means mounted on the evaporator casing for controlling the flow of the liquid on draft.

25. In apparatus for cooling liquids, the combination of an evaporator casing; a plurality of conduits for liquids to be cooled disposed within the casing and wound in parallel relation in each of two coaxial coils arranged one within the other and joined in series at their adjacent ends at the middles of the conduits and said conduits having their inlet and outlet ends connected with casing apertures at the same end of the casing; means for admitting liquid refrigerant through the top wall of the casing to contact with the said coils; and means for discharging gaseous refrigerant from the casing through the top wall thereof.

26. In apparatus for cooling liquids, the combination of an evaporator casing; a plurality of conduits for liquids to be cooled disposed within the casing and wound in parallel relation in each of two coaxial coils arranged one within the other and joined in series at their adjacent ends at the middles of the conduits and said conduits having their inlet and outlet ends connected with casing apertures at the lower end of the casing; means for admitting liquid refrigerant through the top wall of the casing to contact with the said coils; and means for discharging gaseous refrigerant from the casing through the top wall thereof.

27. In refrigerating apparatus, the combination of a refrigerant evaporator; means for maintaining a body of liquid refrigerant in said evaporator; a second evaporator disposed at a higher level than the first mentioned evaporator; and connections between the two evaporators comprising a conduit extending upward from the lower evaporator to the upper evaporator, said conduit having its lower end opening into the liquid refrigerant space of the lower evaporator and being exposed to a surrounding atmosphere having a higher temperature than that corresponding to the normal refrigerant pressure in the conduit and being adapted by the absorption of heat to cause ebullition of refrigerant therein and resultant elevation of liquid refrigerant from the lower evaporator to the upper evaporator.

28. In refrigerating apparatus, the combination of an evaporator casing; means for maintaining a body of liquid refrigerant in the casing; a receptacle in the casing having an opening above the normal quiescent level of the liquid in the casing through which liquid in the casing can flow into the receptacle when the liquid in the casing is elevated by evaporation occurring in the body of the liquid; means for withdrawing from the evaporator casing vapor and liquid entering the said receptacle; and baffle means in the casing comprising a wall outside the said opening of the receptacle adapted to restrict the flow of liquid into the receptacle when evaporation of refrigerant in the casing is particularly vigorous.

29. In refrigerating apparatus, the combination of an evaporator casing; means for maintaining a body of liquid refrigerant in the casing comprising a refrigerant inlet valve and an open cup-shape float in the casing for actuating the valve, said float having its opening disposed at a distance above the normal quiescent level of the liquid in the casing such that liquid in the casing can flow into the float when the liquid in the casing is elevated by evaporation occurring in the body of the liquid; means for withdrawing from the evaporator casing vapor and liquid entering the said float; and baffle means comprising a wall outside the opening of the float adapted to restrict the flow of liquid into the float when evaporation of refrigerant in the casing is particularly vigorous.

HERBERT C. KELLOGG.